(12) United States Patent
Misani et al.

(10) Patent No.: US 8,881,777 B2
(45) Date of Patent: Nov. 11, 2014

(54) TYRE FOR MOTORCYCLES

(75) Inventors: Pierangelo Misani, Milan (IT); Mario Mariani, Milan (IT); Andrea Schiavolin, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 643 days.

(21) Appl. No.: 13/141,543

(22) PCT Filed: Dec. 24, 2008

(86) PCT No.: PCT/IT2008/000800
§ 371 (c)(1),
(2), (4) Date: Jun. 22, 2011

(87) PCT Pub. No.: WO2010/073280
PCT Pub. Date: Jul. 1, 2010

(65) Prior Publication Data
US 2011/0259495 A1    Oct. 27, 2011

(51) Int. Cl.
*B60C 11/117* (2006.01)
*B60C 11/13* (2006.01)
*B60C 11/03* (2006.01)

(52) U.S. Cl.
CPC ......... *B60C 11/0302* (2013.01); *B60C 2200/10* (2013.01); *B60C 2011/0374* (2013.01)
USPC ............. 152/209.11; 152/209.28; 152/209.18

(58) Field of Classification Search
CPC   B60C 11/03; B60C 11/0302; B60C 11/0304; B60C 11/032; B60C 2200/10; B60C 2200/12; B60C 2200/14; B60C 2011/0358; B60C 2011/0372; B60C 2011/0374; B60C 2011/0381; B60C 2011/0383; B60C 11/13
USPC ............... 152/209.28, 209.11, 209.18, 209.8, 152/903, 904, 209.1, 209.16, 209.17
See application file for complete search history.

(56) References Cited

U.S. PATENT DOCUMENTS 4,606,389 A * 8/1986 Haas ......................... 152/209.11
5,105,864 A   4/1992 Watanabe et al.
(Continued)

FOREIGN PATENT DOCUMENTS

EP   0 906 836 A2   4/1999
EP   0 928 707 A2   7/1999
(Continued)

OTHER PUBLICATIONS

International Search Report from the European Patent Office in International Application No. PCT/IT2008/000800 mailed Aug. 19, 2009.
(Continued)

*Primary Examiner* — Eric Hug
(74) *Attorney, Agent, or Firm* — Finnegan, Henderson, Farabow, Garrett & Dunner, L.L.P.

(57) ABSTRACT

A tire for motorcycles, has a tread band and includes an annular central portion and two annular shoulder portions. The tread band includes at least one first groove extending from one annular shoulder portion to the other annular shoulder portion and having a first vertex at the annular central portion, and at least one pair of second grooves arranged on opposite sides with respect to the equatorial plane, each groove of said at least one pair of second grooves being inclined with respect to the equatorial plane and extending from a respective annular shoulder portion up the annular central portion without intersecting the equatorial plane. The distance in the circumferential direction between an axially inner end of each groove of said at least one pair of second grooves and the first vertex is no greater than 3.5% of the circumferential extension of the tread band.

25 Claims, 2 Drawing Sheets

(56) References Cited

U.S. PATENT DOCUMENTS

| | | | |
|---|---|---|---|
| 5,178,697 A * | 1/1993 | Watanabe et al. | 152/209.28 |
| 6,276,415 B1 | 8/2001 | Nakamura | |
| 2003/0116247 A1 * | 6/2003 | Armellin et al. | 152/209.11 |
| 2006/0130949 A1 * | 6/2006 | Nakamura | 152/209.11 |
| 2006/0219342 A1 | 10/2006 | Steinbach | |
| 2009/0078349 A1 | 3/2009 | Nakagawa | |
| 2010/0132864 A1 * | 6/2010 | Colombo et al. | 152/209.8 |

FOREIGN PATENT DOCUMENTS

| | | | |
|---|---|---|---|
| EP | 1 884 377 A1 | | 2/2008 |
| JP | 61-36002 | | 2/1986 |
| JP | 8-188016 | | 7/1996 |
| JP | 2001-39120 | * | 2/2001 |
| JP | 2011-39120 | | 2/2001 |
| JP | 2001-071711 A | | 3/2001 |
| WO | WO 2005/005169 A1 | | 1/2005 |
| WO | WO 2008/074353 | * | 6/2008 |
| WO | WO 2008/074353 A1 | | 6/2008 |
| WO | WO 2008/124899 A | | 10/2008 |
| WO | WO 2010/073279 A1 | | 7/2010 |

OTHER PUBLICATIONS

Notice of Reasons for Rejection in counterpart Japanese Patent Application No. JP 2011-322458, from the Japanese Patent Office mailed May 1, 2013.

Office Action issued by the European Patent Office in European Application No. 08 876 150,7, dated Jul. 30, 2012, 5 pages.

* cited by examiner

TYRE FOR MOTORCYCLES

CROSS REFERENCE TO RELATED APPLICATION

This application is a national phase application bases on PCT/IT2008/000800, filed Dec 24, 2008, the content of which is incorporated herin by reference.

BACKGROUND OF THE INVENTION

1 Field of the Invention

The present invention relates to a tyre for motor vehicles, i.e. a tyre having a high transversal curvature so as to offer an adequate contact surface with the road surface when the motor vehicle is leaning to turn a bend.

2 Description of the Art

Preferably, the tyre of the present invention is intended to be used in a front wheel of motor vehicles of the "Sport Touring" type, i.e. sports motor vehicles intended to offer high performance in terms of power, comfort and mileage on motorways and streets, in cities and/or outside cities and/or off-road, with a wet or dry road surface.

"Sport Touring" motor vehicles typically have a large piston displacement (equal to or greater than 800 $cm^3$) and/or high power (equal to or greater than 110 HP). However, on the market there are already motor vehicles having a piston displacement equal to 1400 $cm^3$ and power equal to 155 HP.

It is known that the tyres for the front wheels of such motor vehicles must ensure high performance on any type of road surface (wet, dry, regular and/or irregular asphalt, etc.) and/or route (city streets, motorways, mountain roads with a large number of bends) and/or load conditions (just the driver, with passenger).

Such tyres must also ensure driving stability, controllability, directionality, road-holding, high mileage and regular wear.

Amongst the aforementioned characteristics, of particular importance is, in the specific case of tyres for front wheels, the water drainage. Indeed, it is essential for the tyre of the front wheel of motor vehicles to be able to ensure effective water drainage in the case of travel on a wet road surface, so that the tyre of the rear wheel, travelling in a straight line on the drained asphalt, can effectively discharge the power and the driving forces to the ground.

For this reason multiple grooves are formed on the tread band of the tyre that extends from the annular central portion of the tread band up to the opposite annular shoulder portions.

It is known how the behaviour of the tyre during travel is greatly influenced by the number, orientation, distribution and shape of such grooves, and thus by the particular pattern of the tread band.

EP 0 906 836 describes a tyre for a motor vehicle the tread band of which comprises a central region astride of an equatorial plane of the tyre and two shoulder regions arranged on axially opposite sides with respect to the central region. In the tread band a plurality of grooves are formed that extend from opposite sides with respect to the equatorial plane starting from the equatorial plane itself up to the shoulder regions and according to a direction that in the central region is substantially circumferential, in the shoulder regions is substantially transversal and in the intermediate regions progressively changes from substantially circumferential to substantially transversal proceeding from the equatorial plane towards the shoulder regions. The grooves formed on one side of the tyre with respect to the equatorial plane thereof are staggered along the circumferential direction with respect to the corresponding grooves formed on the other side of the tyre.

SUMMARY OF THE INVENTION

The Applicant has noted that the water drainage is made particularly effective by providing in the tread band a plurality of grooves which extend from one shoulder portion to the other shoulder portion passing through the annular central portion defined astride of the equatorial plane and crossing the equatorial plane itself. Indeed, such a provision allows, when the motor vehicle turns a slight bend on a wet road surface, the water to pass from one side of the tyre to the other, thus making it easier to drain water towards the outside.

The Applicant has, however, noted that the presence of a large number of grooves of the type described above greatly weakens the structure of such a portion of tread band, making it more subject to wear.

In particular, the Applicant has noted that a large number of grooves at the annular central portion of the tread band implies a reduction in cornering stiffness and an increase in relaxation length. This is undesired, while being advantageous on the other hand, as known, to obtain high cornering stiffnesses and short relaxation lengths to ensure good driving stability.

The cornering stiffness expresses the lateral response force of a tyre mounted on a given rim, subjected to a predetermined load and inflated to a predetermined pressure, to which an angular stress has been applied.

The relaxation length is the ratio between a predetermined cornering stiffness and the rolling speed of the tyre. The cornering stiffness thus provides a measurement of the response time of a tyre that rolls at a predetermined speed to express a predetermined cornering stiffness.

The Applicant has found that it is possible to achieve an effective water draining action and good structural stiffness of the annular central portion of the tread band limiting the extension of some grooves at such an annular central portion (and therefore, in practice, reducing the number of grooves at the annular central portion of the tread band, or in other words, reducing the empty/solid ratio at such an annular central portion). The Applicant has noted that it is advantageous to do this in the case in which the grooves are arranged at a distance apart, in the circumferential direction, shorter than a predetermined value. In particular, the Applicant has noted that, by providing a groove on the tread band arranged at a short distance in the circumferential direction from a respective groove that crosses the equatorial plane, the specific draining action carried out at the annular central portion of the tread band by the portion of groove that crosses the equatorial plane is such as to allow the corresponding portion of tread band defined at the next groove, in the direction in which the tyre rolls, to work on sufficiently drained asphalt. Thus, the presence in such a next groove of a portion of groove that crosses the equatorial plane has no significant effect in terms of water drainage. In this case, therefore, it is advantageous to make the aforementioned next groove so that it does not cross the equatorial plane. In this way the empty/solid ratio is reduced at the annular central portion of the tread band and, therefore, an advantageous strengthening of such a portion of tread band is achieved.

The Applicant has found that the value of mutual distance, measured along the equatorial plane, for which, having a groove present in the tread band that crosses the equatorial plane, it is advantageous to provide the next groove in the circumferential direction so that it does not cross the equatorial plane, is substantially equal to 3.5% of the circumferential extension of the tread band.

The present invention therefore relates to a tyre for motor vehicles, having a tread band extending around a rotation axis and comprising an annular central portion astride of an equatorial plane and two annular shoulder portions arranged on axially opposite sides with respect to the annular central portion, wherein the tread band comprises:
- at least one first groove substantially extending from one annular shoulder portion to the other annular shoulder portion and having a first vertex at the annular central portion;
- at least one pair of second grooves arranged on opposite sides with respect to the equatorial plane, each groove of said at least one pair of second grooves being inclined with respect to the equatorial plane and extending from a respective annular shoulder portion up to the annular central portion without intersecting the equatorial plane;

wherein the distance in the circumferential direction between an axially inner end of each groove of said at least one pair of second grooves and the first vertex is shorter than 3.5% of the circumferential extension of the tread band.

Throughout the present description and in the subsequent claims, the terms "axial" and/or "axially" are used to indicate a direction substantially perpendicular to the equatorial plane of the tyre, i.e. a direction substantially parallel to the rotation axis of the tyre. The terms "circumferential" and/or "circumferentially", on the other hand, are used to indicate a direction substantially parallel to the equatorial plane of the tyre along the circumferential extension of the tyre itself.

The tyre of the present invention advantageously has a high cornering stiffness and a low relaxation length. This is achieved by limiting the number of grooves at the annular central portion of the tread band and, therefore, by reducing the empty/solid ratio at such an annular central portion.

In operation, the presence of first grooves that cross the equatorial plane allows the tyre of the present invention to ensure an effective draining action, whereas the provision of second grooves relatively close in the circumferential direction to the first grooves and made so as not to cross the equatorial plane allows the annular central portion of the tread band not to be greatly weakened without negatively impacting the behaviour of the tyre in terms of water drainage.

The present invention, in the preferred aspects thereof, can have one or more of the following preferred characteristics.

In preferred embodiments of the tyre of the present invention, the tread band comprises at least one third groove extending from one annular shoulder portion to the other annular shoulder portion on the circumferentially opposite side to the pair of second grooves with respect to the first groove, said at least one third groove having a second vertex at the annular central portion and the distance in the circumferential direction between the second vertex and the first vertex being no shorter than 3.5% of the circumferential extension of the tread band.

The Applicant has indeed found that, where the distance in the circumferential direction between two successive grooves is no shorter than 3.5% of the circumferential extension of the tread band, it is advantageous in terms of water drainage to have grooves that cross the equatorial plane.

Preferably, the aforementioned first and second vertices are defined right at the equatorial plane. More preferably, they face to the same way of said circumferential direction, so as to have the same behaviour while the tyre rolls.

Preferably, said at least one first groove, at least one pair of second grooves and at least one third groove belong to a module replicated along the circumferential direction of the tyre and the distance between the axially inner end of each groove of said at least one pair of second grooves of one module and the vertex of a third groove of the circumferentially consecutive module is no shorter than 3.5% of the circumferential extension of the tread band.

For the purposes of the present invention, the expression module of the tread pattern is used to indicate a portion of tread pattern repeated identically in succession along the entire circumferential extension of the tread band itself. The modules, whilst keeping the same design configuration, can nevertheless have different circumferential lengths.

Advantageously, a tyre having the aforementioned characteristics offers high performance with reference to water drainage and is particularly strong from the structural point of view.

In the preferred embodiments of the tyre of the present invention, the tread band comprises, between the axially inner ends of the grooves of said at least one pair of second grooves, a portion of tread band without grooves that extends in the axial direction for a portion no greater than 7% of the axial extension of the tread band.

Preferably, said at least one first groove extends in the circumferential direction for a portion at least equal to 3.5% of the circumferential extension of the tread band.

Preferably, said at least one third groove has an extension in the circumferential direction longer than that of said at least one first groove, and more preferably it extends in the circumferential direction for at least 5% of the circumferential extension of the tread band.

Preferably, each groove of said at least one pair of second grooves has an extension in the circumferential direction shorter than that of at least one of said at least one first groove and at least one third groove, and more preferably it extends in the circumferential direction for a portion greater than 3% of the circumferential extension of the tread band.

Preferably, said at least one first groove extends axially for at least 50% of the axial extension of the tread band.

Preferably, said at least one third groove extends axially for at least 50% of the axial extension of the tread band.

Preferably, each groove of said at least one pair of second grooves extends axially for at least 30% of the axial extension of the tread band.

The Applicant has noted that the aforementioned characteristics, taken individually or in combination, contribute to ensuring effective water drainage and sufficient strength of the tyre.

In a preferred embodiment of the tyre of the present invention, said at least one first groove extends along a broken line comprising at least two rectilinear portions—preferably three rectilinear portions—differently inclined with respect to the equatorial plane of the tyre.

Preferably, a first portion has a first inclination with respect to the equatorial plane of the tyre, a second axially outermost portion with respect to the first portion has an inclination smaller than that of the first portion and a third axially outermost portion with respect to the second portion has an inclination greater than that of the second portion.

Preferably, the axially outermost portion of said broken line has an end portion with opposite inclination with respect to that of the remaining part of the broken line.

Such characteristics, advantageously, give the tyre of the present invention a special appearance, as well as contributing to draining the water from the annular central portion towards the annular shoulder portions and from here towards the outside.

In the preferred embodiments of the tyre of the present invention, said at least one third groove extends along a broken line comprising at least two rectilinear portions—preferably five rectilinear portions—differently inclined with respect to the equatorial plane of the tyre.

Preferably, a first portion has a first inclination with respect to the equatorial plane of the tyre, a second axially outermost portion with respect to the first portion has an inclination smaller than that of the first portion, a third axially outermost portion with respect to the second portion has an inclination greater than that of the second portion, a fourth axially outermost portion with respect to the third portion has an inclination greater than that of the third portion and a fifth axially outermost portion with respect to the fourth portion has an inclination greater than that of the fourth portion.

Preferably, the axially outermost portion of said broken line is, at an end portion thereof, substantially triangle shaped.

The aforementioned characteristics also advantageously give the tyre of the present invention a special appearance and contribute to promoting water drainage.

In the preferred embodiments of the tyre of the present invention, each groove of said at least one pair of second grooves extends along a broken line comprising at least two rectilinear portions which are differently inclined with respect to the equatorial plane of the tyre.

Preferably, such a broken line comprises two rectilinear portions, where a first portion has a first inclination with respect to the equatorial plane of the tyre and a second axially outermost portion with respect to the first portion preferably has an inclination greater than that of the first portion.

Preferably, said second portion has an end portion with opposite inclination with respect to that of the remaining part of the broken line.

The aforementioned further characteristics also advantageously give the tyre of the present invention a special appearance and contribute to promoting water drainage.

In the preferred embodiments of the tyre of the present invention, each of said at least one first, at least one third and at least one pair of second grooves has, for at least part of the circumferential extension thereof, an increasing axial size going from the annular central portion to the annular shoulder portions. This again is in order to make it easier to drain the water.

Preferably, the tread band also comprises at least one pair of fourth grooves arranged symmetrically on opposite sides with respect to the equatorial plane, each groove of said at least one pair of fourth grooves being inclined with respect to the equatorial plane and extending from a respective annular shoulder portion, without intersecting the equatorial plane, for a portion having an axial extension shorter than the axial extension of the grooves of said at least one pair of second grooves.

More preferably, each groove of said at least one pair of fourth grooves has an extension in the axial direction shorter than that of the grooves of said at least one pair of second grooves. Even more preferably, each groove of said at least one pair of fourth grooves extends in the axial direction for a portion having a length no greater than 30% of the overall axial extension of the tread band.

Preferably, each groove of said at least one pair of fourth grooves has an extension in the circumferential direction shorter than that of the grooves of said at least one pair of second grooves. Even more preferably, each groove of said at least one pair of fourth grooves extends circumferentially for a portion no shorter than 2% of the circumferential extension of the tread band.

BRIEF DESCRIPTION OF THE DRAWINGS

Further characteristics and advantages of the tyre of the present invention shall become clearer from the following detailed description of some preferred embodiments thereof, made with reference to the attached drawings given only as non-limiting examples. In such drawings.

DETIALED DESCRIPTION OF THE INVENTION

Figure 1:
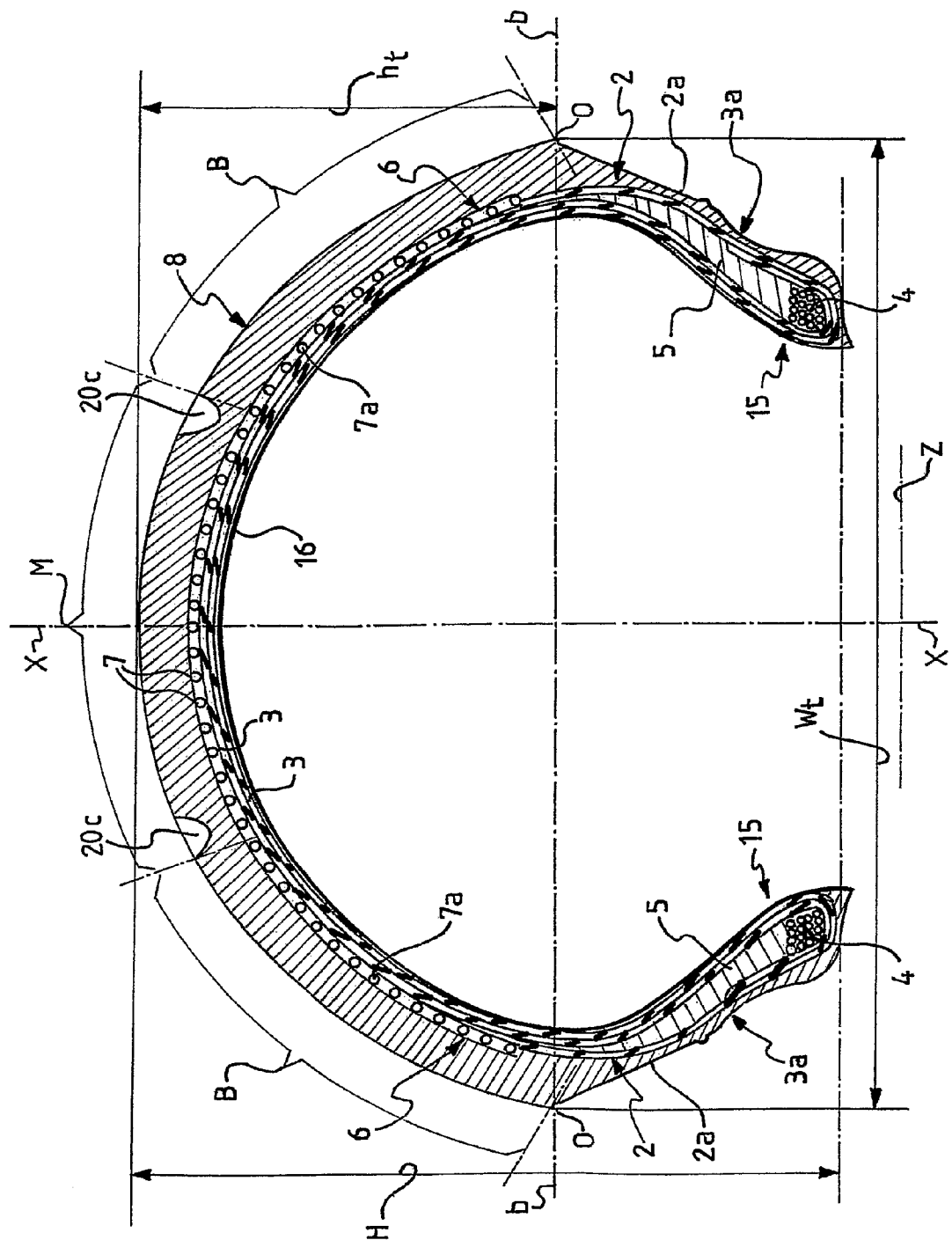
FIG. 1 shows a radial section view of a tyre according to the invention, the section being made according to the line I-I of FIG. 2.

In FIG. 1, a tyre for wheels of motor vehicles according to the present invention is wholly indicated with 1. In particular, it is a tyre intended to be used on the front wheel of a motor vehicle of the "Sport Touring" type.

In the tyre 1 an equatorial plane X-X and a rotation axis Z are defined. A circumferential direction (indicated in FIG. 2 with the arrow R orientated in the direction of rotation of the tyre) and an axial direction perpendicular to the equatorial plane X-X are also defined.

The tyre 1 comprises a carcass structure 2 having a central crown portion 16 including at least one carcass ply 3, two in the embodiment shown in FIG. 1, described later on in greater detail.

The carcass structure 2 is preferably coated on the inner walls thereof with a so-called "liner", essentially consisting of a layer of airtight elastomeric material, suitable for ensuring the hermetic seal of the tyre itself once inflated.

The carcass plies 3 are engaged, at the respective axially opposite side edges 3a, with respective annular reinforcing structures 4 intended to hold the tyre on a corresponding mounting rim. The annular reinforcing structures 4 are typically known as "bead cores".

On the outer perimeter edge of the bead cores 4 a tapered elastomeric filler 5 is applied that occupies the space defined between the carcass plies 3 and the corresponding turned up side edge 3a of the carcass plies 3.

In an alternative embodiment, not illustrated, the carcass ply has the opposite side edges thereof associated without turning up with special annular reinforcing structures provided with two metallic annular inserts. In this case, a filler of elastomeric material can be arranged in a axially outer position with respect to the first annular insert. The second annular insert, on the other hand, is arranged in an axially outer position with respect to the end of the carcass ply. Finally, in an axially outer position with respect to said second annular insert, and not necessarily in contact with it, a further filler which terminates the manufacturing of the annular reinforcing structure can be provided.

As known, the area of the tyre comprising the bead core 4 and the filler 5 forms the so-called "bead", globally indicated in FIG. 1 with 15, intended to fix the tyre on a corresponding mounting rim, not shown.

In a radially outer position with respect to the aforementioned carcass structure a belt structure 6 is provided, also described in greater detail later on.

In a radially outer position with respect to the belt structure a tread band 8 is provided, through which the tyre 1 makes contact with the ground.

The tyre can also comprise a pair of sidewalls 2a applied to the side of the carcass structure 2 on axially opposite sides of the equatorial plane X-X. The sidewalls extend from the tread band 8 to the bead 15 of the tyre.

The tyre 1 of the present invention is characterised by a high transversal curvature and lowered sidewalls.

As known, the transversal curvature of a tyre is defined by the particular value of the ratio between the distance ht (FIG.

1) of the top of the tread band from the line b-b passing through the ends O of the tread, measured on the equatorial plane X-X, and the distance wt between said ends of the tread band. Should the ends of the tread band not be easily identifiable, for example due to the lack of a precise reference like for example the edge indicated in FIG. 1 with O, the distance wt can certainly be assumed to be the measurement of the maximum chord of the tyre.

The value of the aforementioned transversal curvature is called "curvature ratio" or, usually, "tread camber".

The tyre 1 of the present invention preferably has a curvature ratio greater than or equal to 0.2, preferably greater than or equal to 0.28, for example 0.40. Such a curvature ratio is in any case lower than or equal to 0.8, preferably lower than or equal to 0.5.

As regards the sidewalls, on the other hand, the tyre of the present invention is preferably a tyre with particularly low sidewalls (FIG. 1). By tyres with low sidewalls in the present description we mean tyres wherein the ratio between the height H, measured on the equatorial plane X-X between the top of the tread band and the fitting diameter, defined by the reference line l passing through the beads of the tyre, and the distance ht is smaller than 0.7, more preferably lower than 0.5, for example equal to 0.38.

Each carcass ply 3 is preferably made from elastomeric material and comprises a plurality of reinforcing elements (not illustrated) arranged parallel to one another.

The reinforcing elements included in the carcass plies 3 preferably comprise textile cords selected from those usually adopted in the manufacture of carcasses for tyres, for example nylon, rayon, PET, PEN, with an elementary wire having a diameter of between 0.35 mm and 1.5 mm.

The belt structure 6 preferably comprises one or more rubberized cords 7, arranged parallel and side-by-side in the axial direction on the crown portion 16 of the carcass structure 2, to form a plurality of coils 7a. Such coils are substantially orientated according to the rolling direction of the tyre (typically with an angle of between 0° and 5°), such a direction usually being known as "at zero degrees" with reference to how it lies with respect to the equatorial plane X-X of the tyre. The aforementioned coils preferably extend over the entire crown portion 16 of the carcass structure 2.

Preferably, the belt structure 6 consists of a single cord 7, or of a tape of rubberized fabric comprising cords arranged side-by-side, preferably up to five, wound in a spiral from one end to the other on the crown portion 16 of the carcass structure 2.

Alternatively, the belt structure 6 can comprise at least two radially overlying layers, each consisting of elastomeric material reinforced with cords arranged parallel to one another. The layers are arranged so that the cords of the first belt layer are orientated obliquely with respect to the equatorial plane of the tyre, whereas the cords of the second layer also have an oblique orientation, but symmetrically crossed with respect to the cords of the first layer, to form the so-called "cross-belt".

In both cases, generally, the cords 7 of the belt structure 6 are textile or metallic cords. Preferably, such cords are made through steel wires with high carbon content (HT), in other words steel wires with a carbon content greater than 0.9%. In the case of use of textile cords, they can be made from synthetic fibre, for example nylon, rayon, PEN, PET, preferably synthetic fibre with high modulus, in particular synthetic aramid fibre (for example Kevlar® fibres). Alternatively, hybrid cords can be used comprising at least one wire with low modulus, in other words with a modulus no greater than 15000 N/mm² (for example nylon or rayon), interwoven with at least one wire with high modulus (for example Kevlar®), in other words with a modulus no smaller than 25000 N/mm².

The belt structure 6 can also comprise a first support layer substantially consisting of a sheet of elastomeric material arranged between the layer of cords 7 and the carcass ply 3 and on which the coils 7a are wound. Such a layer 9 can extend over a surface having an axial extension substantially corresponding to the surface on which the coils 7a extend. Alternatively, such a layer can extend over a surface smaller than the surface of extension of the coils 7a, for example only on opposite side portions of the belt structure 6.

The belt structure 6 can also comprise an additional layer arranged between the layer of cords 7 and the aforementioned first layer. Such an additional layer can extend over a surface corresponding to the surface of extension of the belt structure 6. Alternatively, the aforementioned additional layer can extend over a surface smaller than the surface of extension of the belt structure 6, for example only on opposite side portions of the belt structure 6.

In a preferred embodiment of the tyre 1 of the present invention, at least one from the layer 1 and the aforementioned additional layer comprises short aramid fibres, for example in Kevlar®, dispersed in the elastomeric material.

Figure 2:
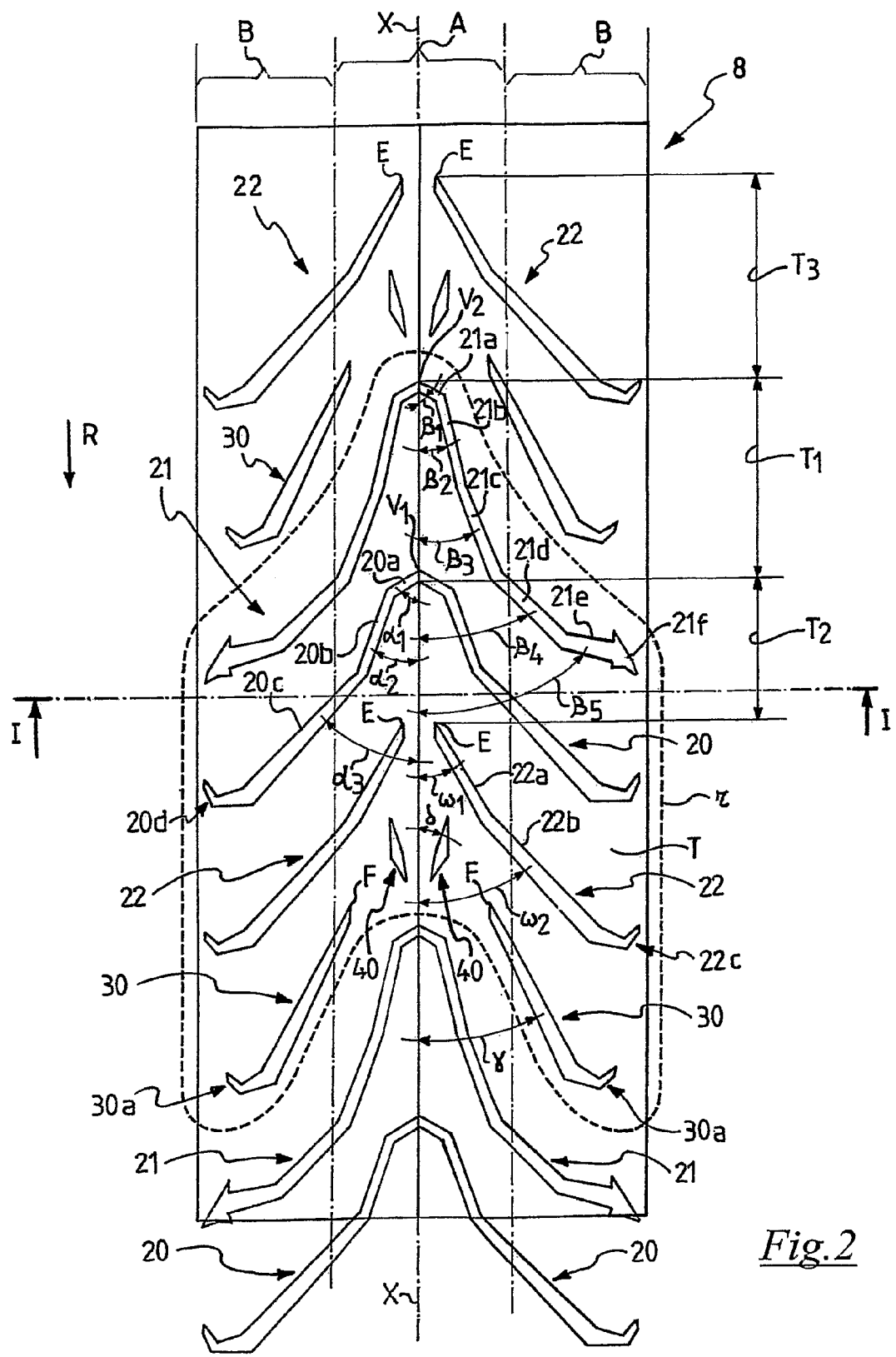
FIG. 2 shows a portion of the plan extension of a portion of the tread band of the tyre of FIG. 1.

As better illustrated in FIG. 2, in the tread band 8 it is possible to identify an annular central portion A arranged astride of the equatorial plane X-X and two axially outer annular shoulder portions B, arranged on axially opposite sides with respect to the annular central portion A.

The annular central portion A is intended to come into contact with the road surface when the motor vehicle travels in a straight line or slightly leaning, whereas the shoulder portions B are mainly intended to come into contact with the road surface when the motor vehicle turns a bend leaning to a greater extent.

With reference to FIG. 2, the annular central portion A extends astride of the equatorial plane X-X for an axial extension shorter than or equal to 60% of the axial extension of the tread band 8, for example equal to about 40%.

The pattern of the tread band 8 of the tyre of the present invention is defined by a plurality of grooves variously distributed along the circumferential and axial extension of the tread band 8.

Such grooves define a pattern that is replicated along the circumferential direction of the tyre 1.

The tread band 8 comprises a module T comprising grooves 20, 21 and 22 that extend symmetrically from axially opposite sides with respect to the equatorial plane X-X. Such a module T is replicated with a predetermined pitch along a circumferential direction of the tyre 1. It is defined in FIG. 2 by a dashed line indicated with r.

The module T of the tread band 8 extends circumferentially by an angle preferably no greater than 50° and no smaller than 30°. Such an angle can for example be equal to about 45°.

Structural details on the grooves 20, 21 and 22 shall be provided later on in the present description.

Again at each module T, the tread band 8 of the tyre also comprises pairs of grooves 30 and 40 also arranged symmetrically on axially opposite sides with respect to the equatorial plane X-X.

Structural details on the grooves 30 and 40 shall be provided later on in the present description.

The groove 20 extends from an annular shoulder portion B to the opposite annular shoulder portion B along a respective broken line that crosses the equatorial plane X-X defining a vertex V1 at such an equatorial plane.

Preferably, the aforementioned broken line has, at each side of the tread band 8 with respect to the equatorial plane X-X, at least two differently inclined rectilinear portions, more preferably three rectilinear portions, where each portion is inclined with respect to the equatorial plane X-X by a respective predetermined angle. However, it is possible to provide for a number of portions other than three.

Preferably, a first axially innermost portion 20a of the groove 20 is inclined by an angle $\alpha 1$, a second axially intermediate portion 20b is inclined by an angle $\alpha 2$ smaller than $\alpha 1$ and a third axially outermost portion 20c is inclined by an angle $\alpha 3$ greater than $\alpha 2$. The angle $\alpha 1$ is preferably between 45° and 70° and, in the specific example of FIG. 2, it is equal to about 57°. The angle $\alpha 2$ is preferably between 10° and 30° and, in the specific example of FIG. 2, it is equal to about 20°. The angle $\alpha 3$ is preferably between 30° and 55° and, in the specific example of FIG. 2, it is equal to about 42°.

The shape of the groove 20 is thus substantially that of a V that increasingly widens moving away from the vertex V1. Such a vertex is defined by the intersection, at the equatorial plane X-X, of the two portions 20a of the two axially opposite portions of the groove 20.

The groove 20 extends overall on the tread band 8 for a portion having a circumferential extension equal to about 4.5% of the circumferential extension of the tread band 8, whereas it extends in the axial direction for a portion having an axial extension equal to about 90% of the axial extension of the tread band 8.

Preferably, the circumferential extension of the portion 20a is no greater than 10% of the overall circumferential extension of the groove 20, the circumferential extension of the portion 20b is no greater than 40% of the overall circumferential extension of the groove 20 and the circumferential extension of the portion 20c is equal to 50% of the overall circumferential extension of the groove 20.

Preferably, the portion 20c has, at an end portion 20d thereof, an end with opposite inclination to that of the other portions of the same groove.

The groove 21 is circumferentially spaced from the groove 20.

The groove 21 also extends from one annular shoulder portion B to the opposite annular shoulder portion B along a respective broken line that crosses the equatorial plane X-X defining, at such an equatorial plane, a vertex V2 orientated, with reference to the circumferential direction R, the same way as the vertex V1.

The distance T1 in the circumferential direction between the vertex V1 and the vertex V2 is no shorter than 3.5% of the circumferential extension of the tread band 8. More preferably, the distance T1 is no shorter than 3.7% of the circumferential extension of the tread band 8.

Preferably, the aforementioned broken line has, at each side of the tread band 8 with respect to the equatorial plane X-X, at least two differently inclined rectilinear portions, more preferably five rectilinear portions, where each portion is inclined with respect to the equatorial plane X-X by a respective predetermined angle. However, it is possible to provide for a number of portions other than five.

Preferably, a first axially innermost portion 21a of the groove 21 is inclined by an angle $\beta 1$, a second axially outermost portion 21b with respect to the first portion is inclined by an angle $\beta 2$ smaller than $\beta 1$, a third axially outermost portion 21c with respect to the second portion is inclined by an angle $\beta 3$ greater than $\beta 2$, a fourth axially outermost portion 21d with respect to the the third portion is inclined by an angle $\beta 4$ greater than $\beta 3$ and a fifth axially outermost portion 21e with respect to the fourth portion is inclined by an angle $\beta 5$ greater than $\beta 4$. The angle $\beta 1$ is preferably between 45° and 70° and, in the specific example of FIG. 2, it is equal to about 57°. The angle $\beta 2$ is preferably between 6° and 25° and, in the specific example of FIG. 2, it is equal to about 13°. The angle $\beta 3$ is preferably between 10° and 30° and, in the specific example of FIG. 2, it is equal to about 21°. The angle $\beta 4$ is preferably between 30° and 60° and, in the specific example of FIG. 2, it is equal to about 44°. The angle $\beta 5$ is preferably between 60° and 85° and, in the specific example of FIG. 2, it is equal to about 74°.

The shape of the groove 21 is thus substantially that of a V that increasingly widens going away from the vertex V2. Such a vertex is defined by the intersection, at the equatorial plane X-X, of the two portions 21a of the two axially opposite portions of the groove 21.

The groove 21 extends overall on the tread band 8 for a portion having a circumferential extension longer than that of the groove 20. Preferably, the groove 21 extends in the circumferential direction for a portion having a length equal to about 6% of the circumferential extension of the tread band 8, whereas it extends in the axial direction for a portion having an axial extension equal to about 90% of the axial extension of the tread band 8.

Preferably, the circumferential extension of the portion 21a is no greater than 10% of the overall circumferential extension of the grooves 21, the circumferential extension of the portion 21b is no greater than 40% of the overall circumferential extension of the groove 21, the circumferential extension of the portion 21c is equal to about 25% of the overall circumferential extension of the groove 21, the circumferential extension of the portion 21d is equal to about 20% of the overall circumferential extension of the groove 21 and the circumferential extension of the portion 21e is equal to about 4% of the overall circumferential extension of the groove 21.

Preferably, the portion 21e is, at an end portion thereof 21f, substantially triangle shaped.

On, the circumferentially opposite side to the groove 21 with respect to the groove 20, the tread band 8 also comprises a pair of grooves 22 inclined with respect to the equatorial plane X-X of the tyre 1. The grooves 22 are arranged symmetrically on opposite sides with respect to the equatorial plane X-X and each extend, along a broken line, from a respective annular shoulder portion B up to the annular central portion A, without intersecting the equatorial plane X-X.

Between the axially inner ends E of the opposite grooves 22 portion of tread band without grooves is provided, that extends in the axial direction for a portion no greater than 7% of the axial extension of the tread band 8.

Each groove 22 has an axially inner end E whose distance T2 in the circumferential direction from the vertex V1 of the groove 20 is shorter than 3.5% of the circumferential extension of the tread band 8.

Preferably, the aforementioned broken line has two rectilinear portions that are differently inclined with respect to the equatorial plane X-X by a respective predetermined angle. However, it is possible to provide for a number of portions other than two.

Preferably, a first axially innermost portion 22a of the groove 22 is inclined by an angle $\omega 1$ and a second axially outermost portion 22b is inclined by an angle $\omega 2$ greater than $\omega 1$. The angle $\omega 1$ is preferably between 20° and 40° and in the specific example of FIG. 2, it is equal to about 30°. The angle $\omega 1$ is preferably between 30° and 60° and, in the specific example of FIG. 2, it is equal to about 40°.

Each pair of grooves 22 thus has an overall V shape which is interrupted at the vertex and that increasingly widens going away from such a vertex.

Each groove 22 extends overall on the tread band 8 for a portion having a circumferential extension shorter than that of the grooves 20 and 21, and preferably equal to about 4.5% of the circumferential extension of the tread band 8, whereas it extends in the axial direction for a portion having an axial extension equal to about 40% of the axial extension of the tread band 8.

Preferably, the circumferential extension of the portion 22a is no greater than 45% of the overall circumferential extension of the groove 22, whereas the circumferential extension of the portion 22b is no greater than 55% of the overall circumferential extension of the groove 22.

Preferably, the portion 22b has, at an end portion thereof 22c, an end with opposite inclination to that of the remaining portions of the same groove.

Preferably, the distance T3 between the axially inner end of each groove 22 of one module and the vertex V2 of a groove 21 of the circumferentially consecutive module is substantially equal to that between the vertices V1 and V2; such a distance is thus preferably no shorter than 3.5% of the circumferential extension of the tread band 8.

Let us now go back to the grooves 30 and 40 of the tread pattern of the tyre 1 of the present invention. The grooves 30 are circumferentially spaced from the grooves 22 on the opposite side to the groove 20 and they each have a circumferential extension shorter than that of the grooves and, preferably, no greater than 5% of the circumferential extension of the tread band 8.

The grooves 30 also extend each from a respective annular shoulder portion B towards the annular central portion A of the tread band 8, without crossing the equatorial plane X-X. They are defined by a single portion inclined with respect to the equatorial plane X-X by an angle γ of between 15° and 35°; in the example of FIG. 2 such an angle is preferably equal to 25°.

The axially outer end 30a of the grooves 30 has an opposite inclination (like that of the grooves 22) to that of the remaining part of groove. Such ends 30a extend over axially innermost annular portions of tread band 8 with respect to those on which the ends 20d, 21f and 22c of the grooves 20, 21 and 22, respectively, extend. The axially inner ends F of the grooves 30, on the other hand, extend on an axially outermost annular portion of the tread band with respect to that on which the vertices V1 and V2 of the grooves 20 and 21, respectively, and the end E of the grooves 22 extend.

The axial extension of each of the grooves 30 is thus shorter than that of the grooves 22 and is preferably equal to about 30% of the axial extension of the tread band 8.

Between the axially inner ends F of the opposite grooves 30 an annular portion of tread band without grooves is provided, that extends in the axial direction for a portion longer than that defined between the ends E of the grooves 22. Preferably, the annular portion of tread band without grooves defined between the ends F has an axial extension no greater than 40% of the axial extension of the tread band 8.

The grooves 40 are formed on the annular central portion A of the tread band 8, symmetrically on opposite sides of the equatorial plane X-X. They are arranged in a axially inner position with respect to the grooves 22, at the portions 22a and 22b of such grooves. The grooves 40 are substantially triangle shaped, with the base of the triangle facing towards the equatorial plane X-X and inclined by an angle δ that in the example of FIG. 2 is in the opposite direction to that of all of the other grooves described above. Preferably, such an angle δ is equal to about 15°.

The circumferential extension of the grooves 40 is shorter than one third that of the grooves 22.

All of the grooves described above, with the exception of the grooves 40, the triangle-shaped end portion 21f of the grooves 21 and the end portions with opposite inclination 20d, 22f, and 30a of the grooves 20, 22 and 30, respectively, have an increasing axial size going from the annular central portion A towards the annular shoulder portions B. Such a characteristic, in combination with the inclination of the grooves allows effective draining of water in wet road conditions, such drainage being made more effective by the fact that the grooves 20, 22 and 30 extend over the opposite annular shoulder portions B of the tyre 1.

Moreover, all of the grooves described above have substantially the same depth, which decreases moving from the annular central portion A towards the annular shoulder portions B.

If needed, grooves of different depths can be provided in the tread band 8.

Advantageously, the tread pattern described above ensures that the tyre 1 of the present invention has an effective water draining action at the annular central portion A of the tread band 8, at the same time ensuring the desired structural strength of such an annular central portion.

Of course, a man skilled in the art can bring further modifications and variants to the invention described above in order to satisfy specific and contingent application requirements, these variants and modification in any case being covered by the scope of protection as defined by the following claims.

The invention claimed is:

1. A tyre for motor cycles, having a tread band extending around a rotation axis with a curvature ratio greater than or equal to 0.2 and comprising an annular central portion astride an equatorial plane and two annular shoulder portions arranged on axially opposite sides with respect to the annular central portion, wherein the tread band comprises:
   at least one first groove substantially extending from an annular shoulder portion to the other annular shoulder portion along a respective broken line defining a first vertex at the equatorial plane;
   at least one pair of second grooves adjacent to said at least one first groove, said at least one pair of second grooves being arranged on opposite sides with respect to the equatorial plane, each groove of said at least one pair of second grooves being inclined with respect to the equatorial plane and extending from a respective annular shoulder portion up to the annular central portion without intersecting the equatorial plane; and
   at least one third groove extending from an annular shoulder portion to the other annular shoulder portion on the circumferentially opposite side to the pair of second grooves with respect to said at least one first groove,
      wherein a distance in the circumferential direction between an axially inner end of each groove of said at least one pair of second grooves and the first vertex, along the equatorial plane, is shorter than 3.5% of the circumferential extension of the tread band.

2. The tyre according to claim 1, wherein said at least one third groove has a second vertex at said annular central portion, a distance in the circumferential direction between the second vertex and the first vertex being no shorter than 3.5% of the circumferential extension of the tread band.

3. The tyre according to claim 2, wherein said first and second vertices are defined at the equatorial plane.

4. The tyre according to claim 2, wherein said first and second vertices face the same way as said circumferential direction.

5. The tyre according to claim 2, wherein said at least one first groove, at least one pair of second grooves and at least one third groove belong to a module replicated along the circumferential direction of the tyre and a distance between the axially inner end of each groove of said at least one pair of second grooves of a module and the second vertex of a third groove of a circumferentially consecutive module is no shorter than 3.5% of the circumferential extension of the tread band.

6. The tyre according to claim 1, wherein the tread band comprises, between the axially inner ends of the grooves of said at least one pair of second grooves, a portion of tread band without grooves that extends in an axial direction for a portion no greater than 7% of an axial extension of the tread band.

7. The tyre according to claim 1, wherein said at least one first groove extends in the circumferential direction for a portion at least equal to 3.5% of the circumferential extension of the tread band.

8. The tyre according to claim 1, wherein said at least one third groove has an extension in the circumferential direction greater than an extension of said at least one first groove.

9. The tyre according to claim 1, wherein said at least one third groove extends in the circumferential direction for at least 5% of the circumferential extension of the tread band.

10. The tyre according to claim 1, wherein each groove of said at least one pair of second grooves has an extension in circumferential direction less than an extension of at least one of said at least one first groove and at least one third groove.

11. The tyre according to claim 1, wherein each groove of said at least one pair of second grooves extends in the circumferential direction for a portion greater than 3% of the circumferential extension of the tread band.

12. The tyre according to claim 1, wherein said at least one first groove extends axially for at least 50% of an axial extension of the tread band.

13. The tyre according to claim 1, wherein said at least one third groove extends axially for at least 50% of an axial extension of the tread band.

14. The tyre according to claim 1, wherein each groove of said at least one pair of second grooves extends axially for at least 30% of an axial extension of the tread band.

15. The tyre according to claim 1, wherein said broken line comprises at least two rectilinear portions that are differently inclined with respect to the equatorial plane of the tyre.

16. The tyre according to claim 15, wherein said broken line comprises three rectilinear portions.

17. The tyre according to claim 16, wherein
a first rectilinear portion has a first inclination with respect to the equatorial plane of the tyre,
a second axially outermost rectilinear portion with respect to the first rectilinear portion has an inclination less than an inclination of the first rectilinear portion, and
a third axially outermost portion with respect to the second rectilinear portion has an inclination greater than the inclination of the second rectilinear portion.

18. The tyre according to claim 1, wherein said at least one third groove extends along a broken line comprising at least two rectilinear portions that are differently inclined with respect to the equatorial plane of the tyre.

19. The tyre according to claim 18, wherein said broken line comprises five rectilinear portions.

20. The tyre according to claim 19, wherein
a first rectilinear portion has a first inclination with respect to the equatorial plane the tyre,
a second axially outermost rectilinear portion with respect to the first rectilinear portion has an inclination less than an inclination of the first rectilinear portion,
a third axially outermost rectilinear portion with respect to the second rectilinear portion has an inclination greater than an inclination of the second rectilinear portion,
a fourth axially outermost rectilinear portion with respect to the third rectilinear portion has an inclination greater than an inclination of third portion, and
a fifth axially outermost rectilinear portion with respect to the fourth rectilinear portion has an inclination greater than an inclination of the fourth rectilinear portion.

21. The tyre according to claim 1, wherein each groove of said at least one pair of second grooves extends along a broken line comprising at least two rectilinear portions that are differently inclined with respect to the equatorial plane of the tyre.

22. The tyre according to claim 21, wherein said broken line comprises two rectilinear portions.

23. The tyre according to claim 22, wherein
a first rectilinear portion has a first inclination with respect to the equatorial plane of the tyre, and
a second axially outermost rectilinear portion with respect to the first rectilinear portion has an inclination greater than an inclination of the first portion.

24. The tyre according to claim 1, wherein each of said at least one first, at least one third and at least one pair of second grooves has, for at least part of the circumferential extension thereof, an increasing axial size from the annular central portion to the annular shoulder portions.

25. The tyre according to claim 5 wherein the tread band also comprises at least one pair of fourth grooves arranged symmetrically on opposite sides with respect to the equatorial plane, each groove of said at least one pair of fourth grooves being inclined with respect to the equatorial plane and extending from a respective annular shoulder portion, without intersecting the equatorial plane for a portion having an axial extension shorter than an axial extension of the grooves of said at least one pair of second grooves.

* * * * *